Patented Jan. 21, 1936

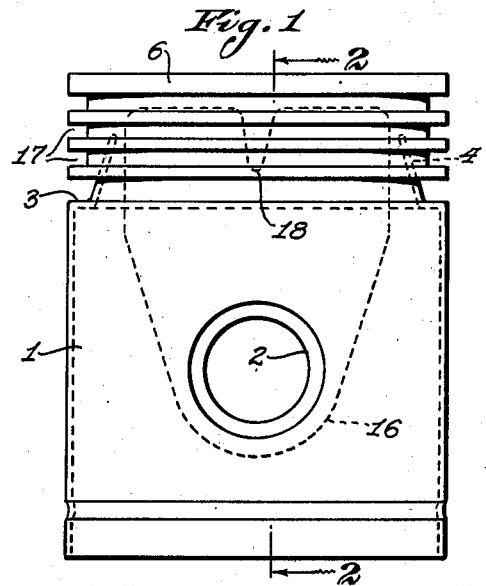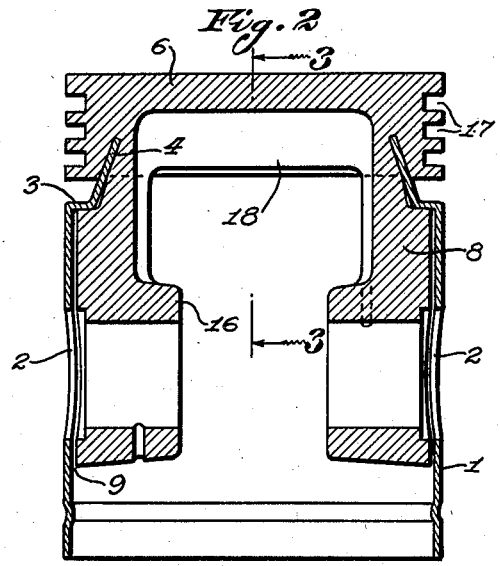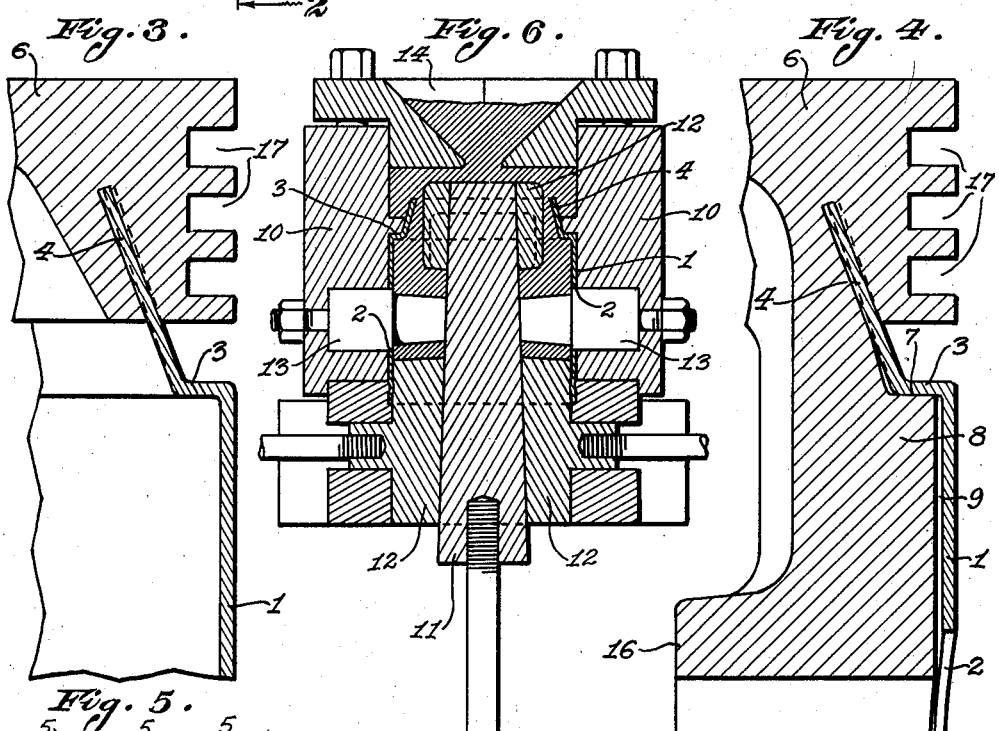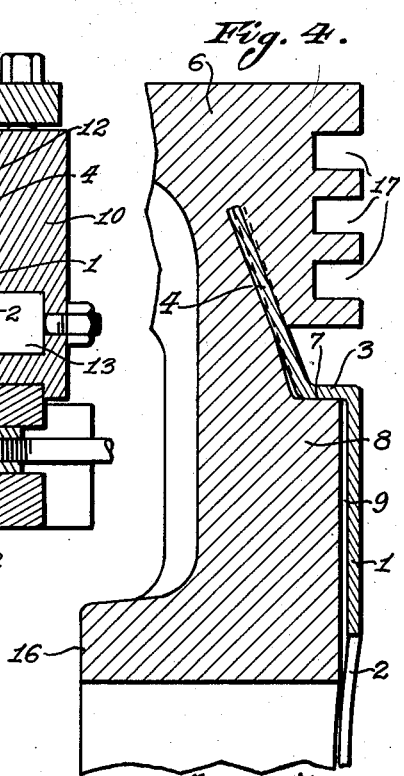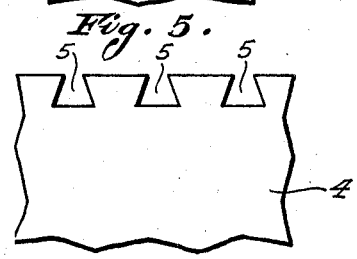

2,028,322

UNITED STATES PATENT OFFICE 2,028,322

COMPOSITE PISTON

John Flammang, University City, Percy L. Bowser, St. Louis, and Herman Ernst, Pine Lawn, Mo., assignors to The Sterling Corporation, St. Louis, Mo., a corporation of Delaware Application July 25, 1932, Serial No. 624,498

14 Claims. (Cl. 22—203)

This invention pertains to pistons and more particularly to trunk type pistons, such as are used in internal combustion engines and the like.

One of the objects of this invention is to provide a piston suitable for use in internal combustion engines which will have a substantially constant fit in the engine cylinder through its working range of temperatures.

Another object is to provide a piston of light weight in which the expansion of the bearing portion of the piston with change of temperature is adapted substantially to keep pace with the expansion of the cylinder in which it is working.

Another object is to provide a piston having a head of light metal having a relatively high thermal expansion and a skirt portion of metal of relatively low expansion, the head and skirt being inseparably secured together in such a manner as to permit the head to expand without forcing a corresponding expansion of the skirt.

Another object is to provide such a composite piston in which the head is cast upon the skirt portion so as to be securely interlocked therewith but in such a manner as to provide a yielding connection adapted to permit the head portion to contract and expand while allowing the skirt portion to practically retain its normal size.

Another object is to provide a method and means for constructing such a piston.

Further objects will appear from the following description taken in connection with the accompanying drawings, in which:—

Figure 1 is a side view of a piston embodying this invention;

Figure 2 is a section on line 2—2 of Figure 1;

Figure 3 is an enlarged detail section of the joint between the head and skirt of the piston on the line 3—3, Figure 2;

Figure 4 is an enlarged detail of Figure 2;

Figure 5 is a detail of the skirt flange; and

Figure 6 is a vertical section of a mold adapted for casting the head on the skirt in accordance with this invention.

In the designing of pistons for internal combustion engines the problem of providing a piston of light weight has been a source of considerable difficulty. To make the entire piston of a metal of low specific gravity would offer a simple solution of this problem were it not for the fact that the metals having this property are also such as to have a much higher thermal expansion than that of iron which is the material of which the cylinders are almost universally constructed. The difference in expansion between iron and aluminum, for instance, the latter being the most practical metal for pistons, makes it impossible to maintain the same clearance between the cylinder wall and the piston skirt at all temperatures. This difficulty has lead designers to try many expedients to accommodate the change in dimensions of the piston as it passes through the range of temperatures involved in the operation of the engine.

It has been proposed to construct the skirt portion of the piston of iron or steel and the head portion of aluminum or one of its alloys. Difficulty in this arrangement has been encountered in securing the skirt to the head in such a manner as not only to make a secure mechanical joint which will withstand the considerable forces involved in the operation of a piston and the effects of the relative expansion of head and skirt, but also to avoid transmitting the expansion and contraction of the head portion to the skirt. In accordance with this invention a skirt portion of iron or steel is provided and a head portion of aluminum or an alloy thereof is cast on the skirt in such a manner as to make a secure mechanical joint. At the same time that portion of the skirt which is embedded in the cast metal of the head is arranged so that it may flex with the contraction of the head metal in such a manner that the difference in expansion between the iron and the aluminum is taken up substantially by this flexure of the connecting portion of the skirt. This portion of the skirt is of special form so that its flexure takes place in a definite manner and the relation of head and skirt are such that during the normal range of temperatures the head may expand without imposing a corresponding expansion upon the skirt portion. As a result of this structure the skirt portion may be so dimensioned as to provide a close fit in the cylinder at low temperatures, and since the iron of the skirt expands at substantially the same rate as the iron of the cylinder, the fit of the skirt in the cylinder does not change materially throughout normal range of operating temperatures.

Referring now to the drawing, which is of an illustrative embodiment of this invention, I designates the piston skirt. This may be constructed of sheet iron or steel drawn to cylindrical form, or of tubing or in any other suitable manner. The skirt I is relatively thin, usually less than one-sixteenth of an inch in thickness. It is formed as a complete cylinder circumferentially continuous throughout; that is, the skirt need not be split or otherwise cut to allow a gap to be taken up by expansion. The skirt portion is perforated at diametrically opposite points to provide openings 2 for insertion of the piston pin. The upper rim of the kirt is formed with an inwardly directed flange 3 which may be substantially radial so as to re-enforce the upper part of the skirt annularly. Inward of the flange 3 a second flange is formed which may be oblique in form with its free edge directed inwardly of the piston and which provides a yielding connection bonded to the head. As shown in Figures 1, 2 and 3 this flange is indicated at 4 and is directed inwardly and upwardly or toward the head end of the piston. The free edge of the flange 4 may be provided with dovetail notches as indicated at 5 in Figure 6. A head 6 of aluminum alloy and provided with the usual ring grooves 17 has extending therefrom and inside of the skirt wrist pin bosses 16 whose bearings are alined with the openings 12 in the skirt. The head may have the usual rib 18 extending thereacross. In the drawing the head is axially spaced from the upper part of the skirt.

The skirt portion having been formed as described above, is placed in a suitable mold as will be explained hereinafter, and head portion 6 is cast thereon of aluminum or an alloy thereof, or other light metal. The arrangement is such that a substantial portion of the flange 4 is embedded in the cast metal of the head. This flange is so formed as to provide a secure mechanical interlock with the cast metal of the head so that the head and skirt are inseparably joined thereby; however, the connection between the head and the skirt is formed to yield, as hereinafter described. The dovetail notches 5, when employed, will assist in providing a secure joint as they become intimately interlocked with the cast metal. The oblique form of the flange 4 also provides an efficient interlocking form providing a secure mechanical joint, although it really forms no dove-tail.

It will be noted that in casting the head portion on the skirt the cast metal of the head is formed wholly within the skirt, except for such portions of the cast metal which lie outside of the flange 4. When the head is cast the skirt portion is usually preheated to a temperature approaching that of the molten cast metal. Accordingly when the cast metal solidifies and cools down to ordinary temperatures the skirt portion also cools down through a nearly equal range of temperature. The cast metal, however, having a greater coefficient of expansion will, upon cooling, contract to a greater degree than the iron skirt. Accordingly the flange 4 will be subjected to a considerable contracting force tending to reduce its diameter. It will be noted, however, that as the free edge of this flange is turned inwardly and is free to flex, or yield, and it is believed that the contraction of the cast metal will have the effect of shrinking the flange 4 and during such shrinkage said flange may flex or yield in the region of its connection to the flange 3. This flexure is indicated by dotted lines in Figures 3 and 4. Since the flange 4 is capable of flexure in this manner and as its outer rim is supported by the radial flange 3, said latter flange on account of its radial direction being much stiffer, the relative contraction between the head and skirt is taken up by the yielding of the flange 4 and the bearing portion of the skirt 1 is affected only to a slight extent by this contraction. During such contraction there may even be some relative movement between head and skirt along the shoulder 7 where the skirt abuts the head metal.

It will also be noted that those portions of the metal which extend below the radial flange 3 are originally cast against the inner surface of the skirt 1. These portions are indicated at 8 in Figures 2 and 4. As these portions are formed by the inner surface of the skirt their maximum dimension is fixed upon solidification by the inner dimension of the skirt. Upon subsequent cooling, therefore, the greater contraction of the head metal will cause the same to draw away from the skirt to form a gap 9 between head and skirt. The size of this gap depends upon the relative contraction of the two metals and is also substantially proportional to the range of temperature through which the original contraction has taken place. It will be clear that the range of subsequent working temperatures can never be as great as the original range of temperature through which this metal has contracted upon being cast. Accordingly subsequent expansion of the head metal during operation of the piston can never be great enough to take up entirely the gap 9. This feature is particularly important where the wrist pin bosses extend downwardly into the skirt. In most prior constructions the difficulty has been encountered that the expansion of the head has been imposed upon the skirt at this point and it has been necessary to relieve the outer surface of the skirt at the points opposite the ends of the wrist pin axis so as to allow for excess of expansion of the skirt at that point. In the present construction such relief of the skirt is unnecessary.

In the manufacture of this piston a mold may be provided, such as illustrated in Figure 6. In this figure, 10 indicates a pair of half portions of a permanent mold which may be arranged in any suitable manner so as to be separable in order to free the finished casting. A collapsible core is provided to form the inner portion of the piston head and the wrist pin boss. This core may have a central section 11 which may be withdrawn downwardly so as to free the two side sections 12 which may then be collapsed toward the center of the mold cavity thereby freeing the interior of the piston so that it may be removed from the mold. Cores for the wrist pin bosses indicated at 13 may be mounted in any suitable manner on the mold halves 10.

In carrying out the method of this invention the formed skirt portion is preheated to a temperature approaching that of the molten cast metal. Usually a temperature just below red= heat is suitable. The heated skirt portion is then mounted in the mold as illustrated in Figure 6 whereupon the cast metal is poured into the mold at the gate 14 in the usual manner. The arrangement is such that the metal flows around the flange 4 so that this flange is embedded in the cast metal upon solidification in the manner already described. When the casting is set the mold may be opened in any suitable manner and the casting removed. The piston may then be finished to size.

It has been found advantageous to mount the skirt in the mold in such a manner that the skirt is sprung out of a true cylindrical form, the diameter along the wrist pin axis being slightly smaller than the transverse diameter. A reduction of about $\frac{1}{32}$ inch on a normal diameter of about 3½ inches has been found to give good results. When this is done the skirt, upon removal from the mold, tends to return to its original form and the consequent movement is opposite in direction to the contraction of the head along the wrist pin axis. Accordingly, a greater gap is formed between the pin bosses and the skirt, and this facilitates the removal of chips and the like which may lodge in this gap.

It will be seen that this invention accomplishes its objects by providing a composite piston so constructed that the difference in the rate of expansion of the two metals is compensated for. This compensation is substantially complete, at least for all practical purposes. The form of the flange 4 whereby it may yield upon contraction of the cast metal provides sufficient flexibility in this joint to permit the skirt to retain its normal size while the head contracts through its complete range of temperature from its original setting temperature. The radial flange 3 provides not only a stiff rim for the skirt which tends to support the same against the contracting forces of the head metal but it also provides a radial abutting surface between head and skirt along which a degree of relative movement may take place in response to changes of temperature. Thus the combination of the flanges 3 and 4 contributes effectively to compensate for the difference in expansion and contraction of the head and skirt.

When the piston has cooled down to ordinary temperatures the flange 4 is flexed or tensioned inwardly, as indicated in the drawing, and the gap 9 is provided within the skirt. As the piston heats up during normal operation in the engine the expansion of the head simply permits the flange 4 to return partially to its original form and at the same time the gap 9 is partly taken up. As the working range of temperature is never as great as the range through which the piston originally cooled there is ample provision for relative expansion without entirely taking up the gap 9, or entirely relieving the forces with which the head metal grips the interlocking flanges of the skirt.

In addition to the effect noted above, these thermal forces, acting on the outside beveled surface of the flange 4, due to longitudinal contraction, tend to crowd the skirt firmly against the head at the shoulder 7 so that all looseness at this point is avoided.

As the cast metal is contracted upon the interlocking flanges of the skirt with considerable force, an intimate contact for the transmission of heat from the head to the skirt is provided. As the skirt is circumferentially complete and of such form as to contact with the cylinder wall practically throughout its extent, an efficient arrangement for the dissipation of heat through the cylinder walls is provided. This tends to keep the skirt relatively cool. It will be noted that the area of contact of the skirt with the cylinder wall is very much greater than the area of contact between the head and skirt and accordingly, altho an intimate contact is provided between the head and the skirt for transmission of heat, yet its area is so limited that the heat can be dissipated to the cylinder walls at a greater rate than it can be transmitted from the head to skirt. This arrangement also tends to prevent an undue rise of temperature of the skirt.

It has been found in actual trials not only that the temperature of the skirt does not rise to a great extent above the temperature of the cylinder but that a substantially constant clearance between piston skirt and cylinder wall can be maintained throughout the maximum range of operating temperatures.

It will be understood that the head may be formed of any suitable metal such as aluminum and magnesium alloys capable of employment in pistons. The skirt may as previously noted be of steel; it may, however, be of cast iron or any other suitable metal or alloy capable of employment in pistons. It will also be understood that the head will have a suitable clearance as determined in practice; the skirt may, however, have a very low clearance.

In the claims, the expressions "aluminum head" and "ferrous skirt" are used. It is to be understood that these terms are used descriptively and not limitatively, so as to comprehend not only aluminum and iron, but also equivalent materials having the respective characteristics of aluminum and iron, and particularly with reference to their respective coefficients of expansion. Thus in the specification the head is described as being of aluminum or an alloy thereof, or other like metal, other examples of which are magnesium and its alloys; while the skirt is described as being of sheet iron or steel, although it may be of cast iron or any any other suitable metal or alloy which has like characteristics, particularly with reference to low coefficient of expansion.

While a certain theory of action has been adopted in the above description this has been done for the sake of providing a clear explanation rather than to fix any definite theory for the action of this device. It is understood, accordingly, that the invention is not limited to any particular theory for the action of the metals or otherwise in the formation of the piston. It is further obvious that various changes may be made, within the scope of the appended claims, in the details of construction without departing from the spirit of this invention; it is to be understood, therefore, that this invention is not limited to the specific details shown and described.

Having thus described the invention, what is claimed is:

1. A composite piston comprising, an aluminum head, a ferrous skirt which is diametrically rigid at its upper end, and a connection from the upper end of said skirt and integrally bonded to said head, said connection having a portion thereof between the bond and the skirt which can yield in order to permit said head to expand relative to said skirt.

2. A composite piston comprising, an aluminum head, a ferrous skirt which is diametrically rigid at its upper end, and an inwardly inclined connection from the upper end of said skirt and integrally bonded to said head, said connection having a portion thereof between the bond and the skirt which can yield in order to permit said head to expand relative to said skirt.

3. A composite piston comprising, an aluminum head, a ferrous skirt annularly reenforced at its upper end, and a connection from the upper end of said skirt and integrally bonded to said head, said connection having a portion thereof between the bond and the skirt which can yield in order to permit said head to expand relative to said skirt.

4. A composite piston comprising, an aluminum head, a ferrous skirt which is diametrically rigid at its upper end, and an inwardly tensioned connection from the upper end of said skirt and integrally bonded to said head, said connection having a portion thereof between the bond and the skirt which can yield in order to permit said head to expand relative to said skirt.

5. A composite piston comprising, a ferrous skirt which is diametrically rigid at its upper end, an aluminum head having bearing bosses thereon and inside of said skirt, and a connection from the upper end of said skirt and integrally bonded to said head, said connection having a portion thereof between the bond and the skirt which can yield in order to permit said head to expand relative to said skirt.

6. A composite piston comprising, a ferrous skirt which is diametrically rigid at its upper end, an aluminum head having bearing bosses thereon and inside of but radially spaced from said skirt, and a connection from the upper end of said skirt and integrally bonded to said head, said connection having a portion thereof between the bond and the skirt which can yield in order to permit said head to expand relative to said skirt.

7. A composite piston comprising, a ferrous skirt which is diametrically rigid at its upper end, an aluminum head spaced axially from said skirt, and a connection from the upper part of said skirt and integrally bonded to said head, said connection having a portion thereof between the bond and the skirt which can yield in order to permit said head to expand relative to said skirt.

8. A composite piston comprising, a ferrous skirt which is diametrically rigid at its upper end and having a connection extending from its upper end, and an aluminum head cast on a part of said connection, said connection having a portion thereof between the head and the skirt which can yield in order to permit said head to contract relative to said skirt.

9. A composite piston comprising, a ferrous skirt which is diametrically rigid at its upper end and having a connection extending from its upper end, and an aluminum head cast on a part of said connection and having bearing bosses cast therewith inside of said skirt, said connection having a portion thereof between the head and the skirt which can yield in order to permit said head to contract relative to said skirt.

10. The method of making composite pistons comprising, bonding an aluminum head to a ferrous skirt which is diametrically rigid at its upper end, by casting the head on to a part of a yielding connection extending from the upper end of the skirt, leaving unbonded a portion of the connection between the head and the skirt which can yield in order to permit the head to contract relative to the skirt.

11. The method of making composite pistons comprising, bonding an aluminum head having bearing bosses to a ferrous skirt which is diametrically rigid at its upper end, by casting the head on to a part of a yielding connection extending from the upper end of the skirt and by casting the bearing bosses inside of the skirt, leaving unbonded a portion of the connection between the head and the skirt which can yield in order to permit the head and bosses to contract relative to the skirt.

12. The method of making a trunk piston having an aluminum head and a ferrous skirt, comprising, contracting the skirt diametrically along the wrist pin axis and casting the head on the skirt while the skirt is maintained in that condition.

13. The method of making a trunk piston having an aluminum head provided with wrist pin bosses and a ferrous skirt, comprising, contracting the skirt diametrically along the wrist pin axis and casting the head onto a part of a yielding connection extending from the upper part of the skirt while the skirt is maintained in that condition.

14. A composite piston comprising a piston head of material having a high coefficient of thermal expansion, a skirt of a material having a relatively low coefficient of expansion, said skirt having a reenforcing shoulder extending inwardly from the periphery thereof in a plane substantially at right angles to the axis of said piston, and connecting means extending inwardly and upwardly from said shoulder and having a portion thereof embedded in the material of said head.

JOHN FLAMMANG.
PERCY L. BOWSER.
HERMAN ERNST.